United States Patent [19]

Arguin

[11] 4,030,171

[45] * June 21, 1977

[54] TANDEM TRAILER SYSTEM

[76] Inventor: Gerard A. Arguin, 3 Valley St., Spencer, Mass. 01562

[ * ] Notice: The portion of the term of this patent subsequent to Jan. 20, 1993, has been disclaimed.

[22] Filed: Jan. 15, 1976

[21] Appl. No.: 649,369

Related U.S. Application Data

[60] Division of Ser. No. 528,786, Dec. 2, 1974, Pat. No. 3,933,374, which is a continuation of Ser. No. 370,744, June 18, 1973, abandoned.

[52] U.S. Cl. .............................................. 280/408
[51] Int. Cl.² ....................................... B62D 53/08
[58] Field of Search ....... 280/404, 408, 411, 415 B, 280/418, 423 R

[56] References Cited

UNITED STATES PATENTS 3,774,940 11/1973 Merritts .............................. 280/408
3,933,374 1/1976 Arguin ................................ 280/408

Primary Examiner—Trygve M. Blix
Assistant Examiner—Stuart M. Goldstein
Attorney, Agent, or Firm—Norman S. Blodgett; Gerry A. Blodgett

[57] ABSTRACT

An intermediate semi-trailer unit which is towed by a highway tractor and tows a standard cargo semi-trailer. The standard trailer is attached to the intermediate trailer unit by a fifth wheel mounted on a portion of the chassis which permanently extends rearwardly beyond the cargo container of the intermediate trailer unit. The fifth wheel is positioned over or ahead of the rearmost bogie of the intermediate trailer unit. Means are provided to form, temporarily, a horizontal platform over the fifth wheel for the loading and unloading of the cargo container.

1 Claim, 4 Drawing Figures

TANDEM TRAILER SYSTEM

This is a division of application Ser. No. 528,786 filed Dec. 2, 1974, now U.S. Pat. No. 3,933,374, which is a continuation of application Ser. No. 370,744 filed June 18, 1973 and now abandoned.

BACKGROUND OF THE INVENTION

For several reasons, the tandem trailer truck concept has become an essential part of any large scale cargo movement over the highway. Furthermore, the idea that one crew and one tractor can tow two or more trailers is attractive, not only because of the increased volume of goods shipped by truck and the increasing cost of individual crews and tractors, but also because the use of several smaller trailers rather than one large trailer is more compatible with modern "cargo module" systems. The cargo module system makes use of a single cargo container which is easily transferable between transportation means.

One important drawback to tandem trailer arrangements has been the problem of safety. A single tractor and trailer loaded with 30 tons of cargo and traveling at 70 miles per hour represents a serious danger no matter how carefully the equipment is maintained and driven. The addition of trailers to the vehicle adds not only to the instability of the combination during heavy breaking, on corners or over bumps, but also adds to the sheer mass of the inertial body.

One of the key elements in the tandem structure is the connection between the trailers. This connection must be strong, stable, compatible with existing equipment, and easy to connect and disconnect. In addition it must take up the load of the rear trailer in such a way that it does not lift the front end of the front trailer. Also, the connection must not interfere with loading and unloading operations.

Most of the connections under consideration use the standard fifth-wheel connector, it being regarded as the best way of hitching a following trailer to a tractor or other trailer. The problem stems from the need to attach the fifth wheel to the leading trailer.

The most popular solution, is to mount the fifth wheel on a small chassis which is, in turn, mounted on a set of wheels called a bogie. This structure is pulled behind the forward trailer through a combination of poles and hooks, with the rear trailer attached to the fifth wheel. Although this idea is relatively inexpensive and is suited for use with present equipment, the connection between the structure and the leading trailer is regarded as inadequate for safety and stability. Technically, this arrangement is a true trailer rather than a semi-trailer (the proper term for a trailer not completely supported by its own road wheels), a fact which can greatly modify its operating characteristics.

All of the other solutions involve radically redesigned trailers, an idea which will not be accepted quickly due to large capital investment and the problems of acceptance by government regulatory agencies and the drivers. In addition, most of the present designs have technical drawbacks. In one plan, the chassis of the two trailers would be rigidly connected and the bogie of the forward trailer moved back to form a tandem axle at the rear of the combination (see the U.S. Pat. No. 3,102,738 of Roshia. This concept is limited to short trailer lengths, it requires that both trailers be of the new design, and it results in two non-self-supported halves should the non-conventional connection accidently come apart in transit.

The idea of attaching the rear trailer of a fifth wheel which is, in turn, connected directly to the chassis of the forward trailer, has taken several forms. In a somewhat different form of truck, an automobile carrier (see the Davis et al. U.S. Pat. No. 1,880,123) the concept of extending the chassis beyond the auto deck and attaching a fifth wheel to the extension was attempted. Since loading operations were always carried out from the rear of the rear trailer and, therefore, not impeded by the presence of the fifth wheel and since relative low-weight density of automobiles did not apparently cause the force couple of the forward trailer to result in a lifting of the front of the trailer by the weight of the rear of the trailer, the problems of transfer of the idea to a regular cargo trailer were not recognized.

In order to allow the loading and unloading of cargo, trailer designers decided that the fifth wheel must not extend beyond the end of the cargo container (see the Bennett et al. U.S. Pat. No. 3,163,306). The restricted access to a fifth wheel under the cargo container and the need for a specially designed rear trailer are obvious problems. In a refinement of the above idea, the fifth wheel and its associated bogie are slidably mounted to the frame (see the Crockett et al. U.S. Pat. No. 3,374,010). In its forward position, the fifth wheel is out of the way of the loading operation, and in the rearward position, it is accessible to a standard rear trailer. The problems of creating a practical sliding connection which is easy to operate and strong enough to withstand the tremendous stresses involved are formidable. These and other difficulties experienced with the prior art devices have been obviated in a novel manner by the present invention.

It is, therefore, an outstanding object of the invention to provide a trailer unit adapted to carry cargo behind a highway tractor in order to move goods over the road.

Another object of this invention is the provision of a trailer unit adapted to tow an additional cargo trailer using a standard fifth-wheel arrangement.

A further object of the present invention is the provision of a trailer unit in which the rear fifth-wheel unit is unencumbered by overhang of the cargo container because the trailer chassis extends beyond the cargo container.

It is another object of the instant invention to provide a trailer unit in which the rear fifth wheel is supported from directly beneath by a bogie thereby avoiding a force couple between the front and rear of the trailer.

A still further object of the invention is the provision of a trailer unit having a rigid chassis in which looseness and relative movement within itself are eliminated.

It is a further object of the invention to provide a trailer in which a gate is provided which can form a loading platform over the rear fifth wheel and behind the cargo container.

It is a still further object of the present invention to provide a trailer unit which forms a safe, stable tandem trailer which is simple to connect with another standard trailer.

With these and other objects in view, as will be apparent to those skilled in the art, the invention resides in the combination of parts set forth in the specification and covered by the claims appended hereto.

SUMMARY OF THE INVENTION

This invention involves a cargo-carrying trailer unit adapted to be towed behind a standard highway tractor and adapted to tow a standard trailer. The trailer of this invention includes an elongated cargo container accessible at the rear end, a chassis on which the container is mounted and which extends beyond the rear of the container, and a king pin at the front end of the chassis to engage a fifth wheel on a tractor. Mounted on the extended portion of the chassis are a fifth wheel and the trailer bogies at least one of which is located beneath or to the rear of the fifth wheel. A movable horizontal platform is provided over the fifth wheel, the platform extending from the end of the cargo container to a point above the rear end of the chassis.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
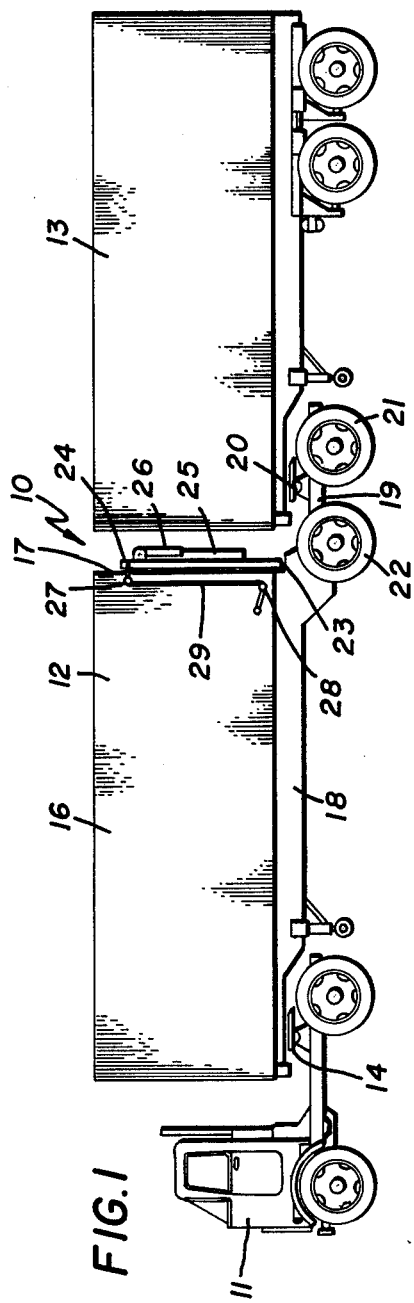
FIG. 1 is a side elevation view of a tandem trailer truck arrangement embodying the principles of the present invention.

Referring first to FIG. 1, wherein are best shown the general features of the present invention, the tandem trailer system, denoted generally by the numeral 10, is shown to include a highway tractor 11, a forward trailer 12, and a rear trailer 13.

The highway tractor 11 is of the normal type having at its rear end a standard tiltable fifth wheel type connector 14.

The forward trailer 12 is attached to the tractor 11 by a king pin 15 (shown in FIG. 2) and the fifth wheel 14. It should be noted that the trailers of this discussion are of the type more specifically known as semi-trailers, that is, trailers designed so that a portion of the weight is carried by the towing vehicle. The forward trailer 12 consists of a rectangular, closed cargo container 16 having a rear end access door 17, and a chassis 18 which extends beyond the end of the cargo container 16 to form an extension 19. On the upper surface of the extension 19 is mounted a tiltable standard fifth wheel 20 by which the rear trailer 13 can be connected to the chassis 18 of the forward trailer 12. Beneath or to the rear of the fifth wheel 20 is the rearmost bogie 21 of the forward trailer 12. The rearmost bogie 21 should be placed so that downward force exterted on the fifth wheel 20 does not result in a lifting of the forward end of the forward trailer 12. Additional bogies 22 are attached to the chassis 18 consistant with regulations on weight to wheel ratios.

On the upper surface of the chassis 18, just behind the cargo container 12, is hingedly mounted by hinge 23, a platform 24. Attached to the rearward or downward surface of the platform 24 is a plate 25 which engages the fifth wheel 20 when the platform is in its horizontal position, and foldable legs 26 which engage the chassis 18 when the platform is in its horizontal position. A pulley 27, crank 28 and cable 29, are attached to the cargo container 16 or in the case of removable cargo containers to the chassis, in order to move the platform 24 between its horizontal and vertical positions. FIG. 1 shows the platform 24 in its vertical position.

Figure 2:
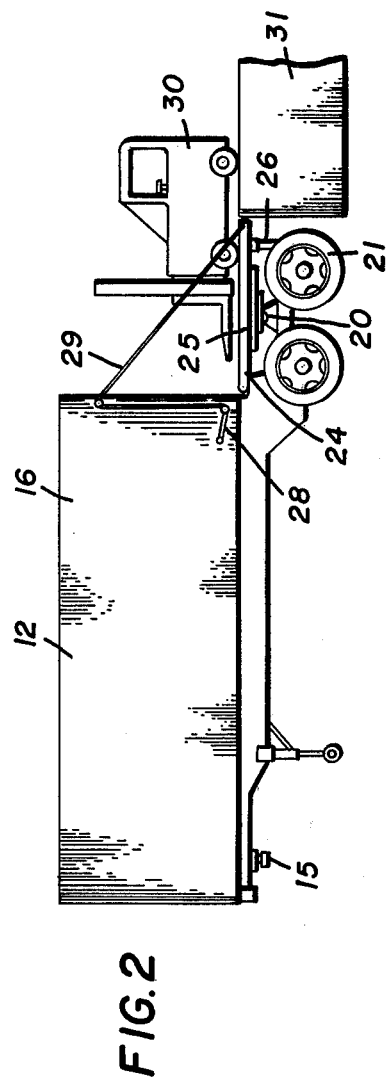
FIG. 2 is a side elevation view of a trailer unit being unloaded.

Rear trailer 13 is a semi-trailer of standard design. FIG. 2 shows the forward trailer 12 as it is being unloaded by a fork lift 30 onto a loading dock 31. The platform 24 is in its horizontal position with the plate 25 contacting the fifth wheel 20, and the legs 26 unfolded.

Figure 3:
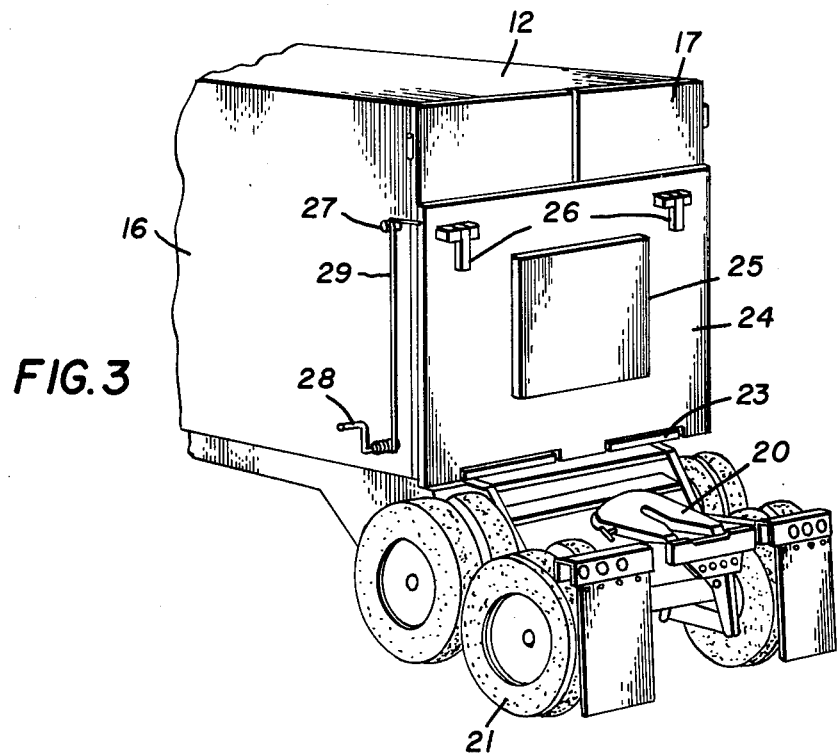
FIG. 3 is a perspective view of the rear of the trailer unit with the platform in its inoperative position.

FIG. 3 shows details of the extension 19 and the platform 24 in its vertical position.

Figure 4:
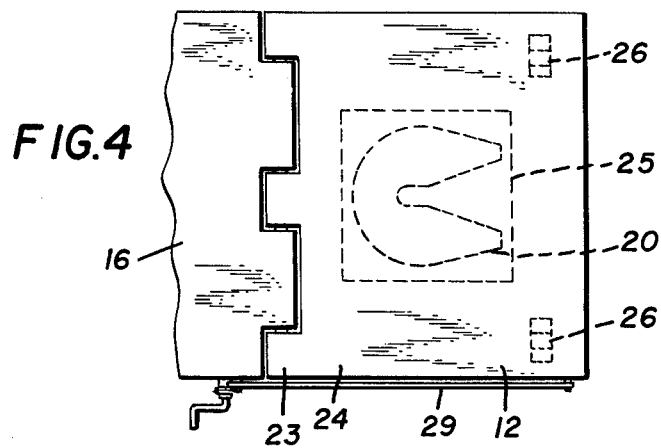
FIG. 4 is a plan view of the rear of the trailer unit with the platform in its operational position.

FIG. 4 shows a top view of the platform 24 in its horizontal position. The platform 24 is held on hinge 23, between the platform 24 and the chassis 18.

The operation of the invention will now be readily understood in view of the above description. FIG. 1 shows the tandem trailer system using the described trailer unit as the forward trailer. As shown, it would be used for bulk transfer of goods over long distances. The platform 24 is held in its vertical position by cable 29, and the legs 26 are folded.

To load or unload the contents of the forward trailer 12, the rear trailer 13 is decoupled in the normal manner and the rear of the forward trailer is positioned against a loading dock. The crank 28 is operated to release the cable 29 and thereby allow the platform 24 to move to its horizontal position. In the horizontal position, the platform 24 is supported from beneath by the plate 25 which is in contact with the fifth wheel 20, and the legs 26 which unfold and contact the chassis 18. The platform thereby allows access from the loading dock 31 to the cargo container 16.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A trailer unit to be towed behind a highway tractor, and behind which may be towed another trailer, the trailer unit comprising
   a. a cargo container,
   b. a chassis on which the container is mounted, the chassis having a first and a second end, a portion of the chassis associated with the second end extending downwardly and rigidly beyond an end of the cargo container,
   c. first attaching means associated with the first end of the chassis by which the chassis can be connected to a highway tractor,
   d. a second attaching means associated with the portion of the chassis which extends beyond the end of the cargo container, by which another standard trailer can be attached to the chassis, the second attaching means being entirely below a horizontal plane which includes the lowest portion of the cargo container and at the level of the first attaching means,
   e. a first set of wheels attached to the said portion of the chassis, at a point where the set is at least as far away from the first end as the second attaching means, an entrance to the cargo container being provided facing toward and adjacent the second end of the chassis, and
   f. a second set of wheels attached to the chassis between the first end and the first set of wheels.

* * * * *